Aug. 1, 1950

W. FEW 2,517,101

ELECTRONIC MOTOR CONTROL SYSTEM

Filed Dec. 26, 1946

INVENTOR
William Few
By Harry P. Canfield
ATTORNEY

Aug. 1, 1950 W. FEW 2,517,101
ELECTRONIC MOTOR CONTROL SYSTEM
Filed Dec. 26, 1946 2 Sheets-Sheet 2

INVENTOR
William Few
By Harry R. Canfield
ATTORNEY

Patented Aug. 1, 1950

2,517,101

UNITED STATES PATENT OFFICE 2,517,101

ELECTRONIC MOTOR CONTROL SYSTEM

William Few, Cleveland Heights, Ohio, assignor to The Clark Controller Company, Cleveland, Ohio, a corporation of Ohio Application December 26, 1946, Serial No. 718,426

13 Claims. (Cl. 318—260)

This invention relates to motor control systems of the class in which an electric motor of the direct current shunt field type is controlled as to starting and stopping, and running and reversing by operators' push buttons or like control contactors; and in which various automatic control features, protective features, and adjustments are provided; and in which the current for the motor and the controls is supplied from an alternating current source, rectified by electronic tubes.

The motor control system embodying the invention and to be described herein comprises various features of operation and control among which may be mentioned the following:

The speed of the motor may be adjustably varied or preset by the operator, and, at any adjustment, the motor speed is automatically maintained constant in spite of variations of the driven load, or supply voltage.

The maximum current which the motor can take is always automatically limited to a safe value by the control, whereby motor acceleration, at the maximum safe rate, with or without load on the motor, is provided; and whereby, while driving a variable load, or upon reversing the motor while running, the motor current cannot exceed a safe amount; with the result that both the motor itself and the rectifying tubes which supply rectified current to the motor are automatically protected at all times against damage by excessive current.

Upon reversing of the motor while running, the motor is first brought quickly to rest, by inversion at the rectifying tubes supplying motor armature current, so that the energy to stop the motor is not dissipated but supplied back to the alternating supply means.

A constant potential is maintained in the system for control purposes whereas the voltage supplied to the motor is varied to maintain the motor speed constant, even when under variable load; and correction is automatically made for changes of main supply potential; and, optionally, the motor speed may, by adjustment, be made to change as desired with changes of load.

These features of operation are accomplished while maintaining the motor field at constant potential, with resulting control system simplification.

The control of the potential applied to the motor is effected by shifting the phase of the grid energization of the rectifying tubes supplying current to the motor armature, and in a manner to prevent the rectifying tubes from passing excessive current when unidirectional potential is impressed on the tubes as the result of quick reversal of the motor while running.

As an important feature of the system, it comprises means to stabilize the functioning of various parts of the system, and to prevent hunting above and below the values of current and potential for which the parts of the system are set or adjusted.

While some of the end results of some of these features have in general been heretofore proposed in prior systems of this class, the invention herein as to such known features resides in the means by which such features of operation and control are performed in an improved manner.

The objects of the invention therefore are to provide generally an improved motor control system of the class referred to, in which the various features mentioned above, and others which will become apparent, and referred to hereinafter, are performed.

The invention is fully disclosed in the following description taken in connection with the accompanying drawing, in which.

Figure 1:
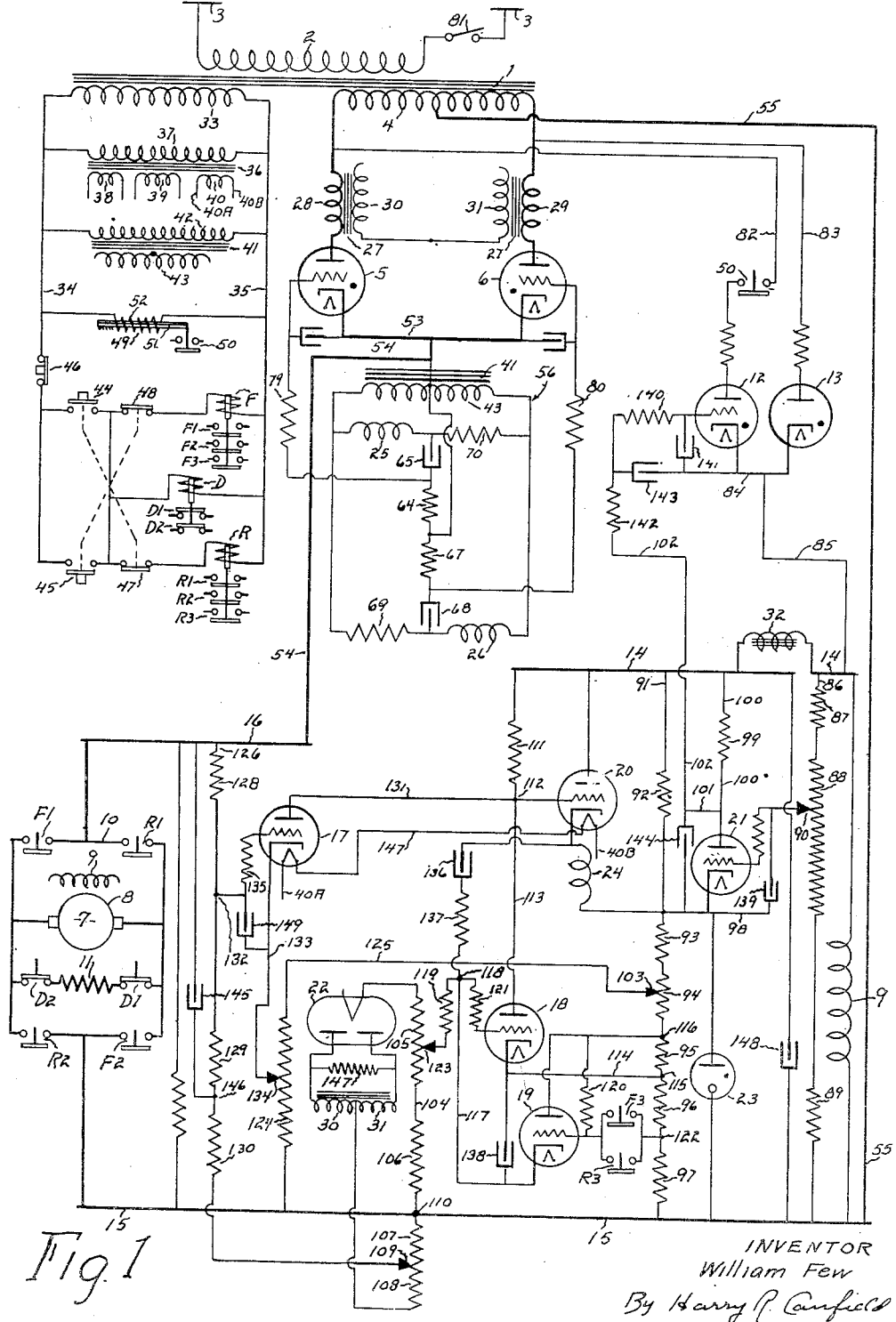
Fig. 1 is a diagrammatic view illustrating a motor control system embodying the invention.

Referring to the drawing Fig. 1, there is shown at 1 a main transformer having a primary 2 connected to a source of alternating potential 3—3 and a secondary 4 which supplies potential and current to the motor, and the control.

At 5 and 6 are main rectifier tubes supplying rectified potential to a part of the control system and particularly to the armature 7 of the motor 8 which as indicated has a shunt field 9 associated therewith without circuit connections, but reproduced at 9 in the right hand side of the diagram with its connections to the system; and this method of illustrating other parts of the system is used hereinafter to avoid complexity of the diagram.

At the motor 8 is a loop circuit 10 in which are contacts, F1—F2, for forward running of the motor; and contacts, R1—R2, for reverse running; and contacts, D1—D2, and a dynamic braking resistance 11 associated therewith. These contacts control the running of the motor and will be referred to again later.

At 12—13 are rectifier tubes for supplying potential to a pair of mains 14—15 which energize the field 9 and a part of the control system.

The mains 14—15 for convenience may be considered as control mains, and as always positive and negative respectively, the potential across them being maintained constant by the control; and at 16 is indicated a main which may be considered as associated with the main 15; and which mains 16—15 may for convenience be considered as always positive and negative respectively, and considered as motor armature mains, the potential across the mains 16 and 15 being supplied by the tubes 5 and 6 and variable by the control.

Figure 2:
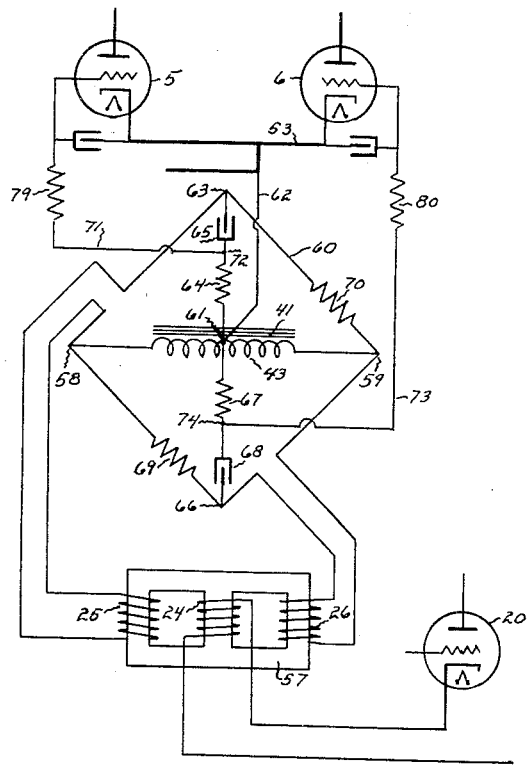
Fig. 2 is a diagrammatic view of a phase shifting part of Fig. 1 with the elements thereof represented in a different manner for simplifying the description thereof.

At 17, 18, 19, 20, and 21 are electronic tubes; at 22 is a double diode rectifier tube; at 23 is a constant voltage regulator tube of the gas-filled cold cathode type; at 24 is indicated the unidirectional winding of a saturable reactor and at 25 and 26 are alternating current windings of the saturable reactor, these three windings being diagrammed in Fig. 1 as isolated from each other, but their relationship on a common saturable reactor core is reproduced in Fig. 2.

At 27—27 is a transformer having primaries 28—29 in series with the triodes 5—6, and secondary parts 30—31 reproduced with circuit connections elsewhere in the diagram.

At 32 is an inductive reactor.

The main transformer 1 has, besides the secondary 4, a secondary 33 energizing mains 34—35 across which are connected the primaries of auxiliary transformers as follows: a transformer 36 having a primary 37 and a plurality of secondaries 38, 39, 40, etc. which may be considered as supplying heating current to the cathodes of the several tubes mentioned above, but which according to convention and for simplicity are not shown associated with the tubes in the diagram; and a transformer 41 having a primary 42 and a secondary 43 reproduced elsewhere in the diagram Fig. 1 and also in Fig. 2 where its circuit connections are fully shown.

Across the mains 34 and 35 are also connected the windings of electromagnetic contactors, a forward contactor F having said main contacts F1—F2, and auxiliary contacts F3; a reverse contactor R, having said main contacts, R1—R2 and auxiliary contacts R3; a braking contactor D having the said normally closed dynamic braking contacts D1—D2. These contactors are under the control of a start push button 44; a reverse push button 45; and a stop push button 46.

The operation of these contacts F, R, and D is conventional, and may be disposed of here. Closing the start push button 44 (and opening interlocked contacts 47) effects closing of the forward contacts F1—F2 in the motor loop circuit 10 for forward running of the motor 8; closing the reverse push button contact 45 (and opening interlocked contacts 48) effects closing of the reverse contacts R1 and R2 for motor reverse running; and in either case the dynamic braking contacts D1 and D2 are opened. When both push buttons 44 and 45 are open, the dynamic braking contacts D1—D2 close, and put the braking resistance 11 across the motor armature 7 to brake it. Opening stop push button 46 effects opening of either the forward or the reverse contacts that may be closed, and closing of the braking contacts to brake the motor. The forward and reverse contactors F and R may be provided with maintaining circuits not shown to hold them operated if desired under domination of the stop contactor 46 as well understood. Whenever the contacts F1—F2 or R1—R2 open, the corresponding auxiliary contacts F3 or R3 open.

At 49 is a delayed operation contactor having contacts 50 which close only after a time interval of delay after first energizing the system by the main primary 2; and while any suitable type of contactor may be employed here that illustrated comprises a bi-metal element 51 heated by a heater 52 connected across the mains 34—35.

Other elements of the system such as capacitors, resistors, etc. and the circuit connections of the system will be described during the description of the operation of its parts which follows.

The tubes 5—6 connected by their anodes to the bi-phase secondary 4, are connected to supply full-wave rectified potential, to the mains 16-15 and current to the motor armature 7, (under control of a tube grid phase shifting system), by way of a cathode connecting wire 53, a wire 54 to the main 16, and a wire 55 from the main 15 to the mid-tap of the bi-phase secondary 4.

The grid phase shifting system for the grids of the tubes 5 and 6, and shown generally at 56 immediately under the cathode connecting wire 53, (besides comprising the transformer 41 and its secondary 43, and the saturable reactor windings 25 and 26 identified above) comprises the unidirectional winding 24 of the saturable reactor, shown in the diagram as associated with the tube 20; and these and other parts of this phase shift system including the saturable reactor core 57 are collected and shown separately in Fig. 2 represented in the form of a bridge circuit for more convenient consideration, and will now be described.

In general, phase shifting of the grid potential of a rectifier tube to control its output is known. Alternating potential of the same frequency as that impressed on the mains electrodes of the tube, but of generally opposite polarity energizes the grid. Diagrammatically speaking, and as will be well understood by those skilled in the art, the grid wave is shifted with respect to the tube-impressed wave so that it spans more or less, so to speak, of the base of the tube-impressed wave, and, during the conducting half of the tube-impressed wave, causes firing of the tube to occur earlier or later in the tube-impressed wave.

When phase shifting is utilized in connection with a rectifier tube controlling the current to a direct current type reversible electric motor, however, a defect of such prior systems generally is present. The motor when running say in the forward direction develops unidirectional counter-electromotive force which opposes the tube-impressed wave; and in such cases the firing of the tube can be satisfactorily controlled by phase shifting; but when the motor, while running, is reversed, the unidirectional motor counter potential is added to or superimposed upon the tube-impressed wave, and has the effect of making the tube-impressed wave higher, and, more particularly, broader at the base. This, and the general "plugging" action of the motor, when reversed while running, tends to cause damaging current values to flow through the motor and the rectifier tubes, by rendering the ordinary phase shifting arrangement inadequate to safely control it, and for the following reasons.

In the conventional phase shifter, the grid wave is shifted toward a position of 180 degrees out of phase with the tube-impressed wave, to delay the time of firing, to reduce the current flow through the tube, and then may span the greater part of the base of the tube-impressed wave. In the case here considered, however, where the base of the tube-impressed wave is made abnormally wide, the grid wave is unable to span enough of it to fully control the tube output, and if the grid wave continues to be shifted in the late firing direction in the attempt to control it, it will, after a degree of shifting uncover the tube-impressed wave base at its opposite end, and cause the tube to begin to fire at an early point in the tube-impressed wave, and cause excessive damaging current to flow to the motor, because the grid wave is narrower at its base than the tube-impressed wave.

In the phase shifting system employed in the present invention the grid wave itself has superimposed thereon a unidirectional component which has the effect of making the grid wave also broader at its base, so that it is at all times wide enough to span enough of the base-broadened, tube-impressed wave, to control the tube output, whereby when the phase of the grid wave is shifted in the direction to reduce the tube current it can delay firing of the tube as late as desired. But as a further precautionary and safety measure, the grid wave is given a permanent displacement toward the early part of the tube impressed wave.

These features and the above mentioned resulting improvements are obtained by the grid wave phase shift system which will now be described in connection with Fig. 2 which is a reproduction of a part of Fig. 1, as referred to above, with the parts represented in a bridge type circuit for more convenient consideration.

The bi-phase secondary 43 is connected across the diagonal corners 58 and 59 of a bridge loop 60, the mid-point 61 of the secondary being connected by a wire 62 to the cathode connecting wire 53. The point 61 is connected to one of the opposite corners 63 of the loop through a resistor 64 and a capacitor 65, and to the other opposite corner 66 through a resistor 67 and a capacitor 68. Phase shifting resistors 69 and 70 are connected between the points 58—66 and 59—63 respectively; and the phase shift inductances 25 and 26 wound on the two end legs of the three leg saturable reactor core 57 are connected between the points 58—63 and 59—66 respectively. The unidirectional winding 24 on the middle leg of the reactor core has its current variably controlled for phase shifting purposes by the main current in the tube 20, to be referred to.

The grid of the tube 5 is connected by a wire 71 to a point 72 between the resistor 64 and the capacitor 65; and the grid of the tube 6 is connected by a wire 73 to a point 74 between the resistor 67 and the capacitor 68.

It will be noted that the transformer 41 of which 43 is the secondary, is energized as shown in Fig. 1, by its own primary 42, receiving its energization from the main supply, so that the phase of the winding 43 is fixed by the main supply and does not shift in the phase-shifting operation of the system; a fact which is not true of prior systems of this class.

Figure 3:
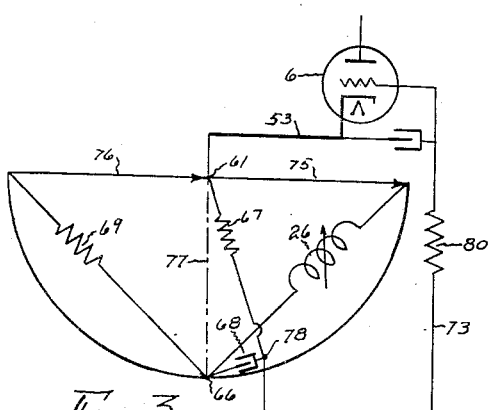
Fig. 3 is a vector diagram, further illustrating the functions of the elements as represented in Fig. 2.

In Fig. 3 is conventionally represented the vector relations of this phase-shift system, for the grid of the tube 6, the vectors 75—76 representing the potentials of the bi-phase secondary 43; and the reference characters identifying other parts of the system of Fig. 2.

Those skilled in the art will understand that an imaginary line 77 between the points 61 and 66 shifts angularly around the point 61 when the inductance of the winding 26 is changed by variably energizing the unidirectional winding 24 of the saturable reactor; and that if the grid wire 73 were connected to the point 66, the line 77 would then represent vectorially the shifting grid potential.

Where as in Figs. 2 and 3, however, the resistor 67 and the capacitor 68 are connected in series across the points 61 and 66, the alternating potential between these points accordingly is composed of two components at right angles to each other at the point 78 between them, so that the point 78 is displaced vectorially from the point 66; and the grid energizing wire 73 being connected to the point 78, the grid potential is accordingly at all times displaced or given a permanent shift or displacement; and as will be understood from the diagram, Fig. 3, this permanent shift is toward the early part of the tube-impressed wave.

The energizing potential for the grid circuit, comprising the wire 73 and the cathode connecting wire 53, will be the potential drop across the resistor 67, and, as will be apparent, if the capacitor 68 has a charge thereon of suitable polarity, the capacitor will superimpose its unidirectional potential upon this grid energizing potential for the purposes discussed above, and in the system here considered, the said charge on the capacitor 68 is provided for as follows.

Since there is alternating potential across the points 61—66, alternating current flows therebetween. When the current flows from the point 66 toward the point 61 all of it flows through the capacitor 68 and charges it. On the next half cycle the current flows from the point 61 toward the point 66, and the capacitor gives up part of its charge at the point 78.

The polarity of the grid potential at the point 78 thus reverses on each half cycle, suitably to control firing of the tube 6 in its conducting half wave, and the charge on the capacitor 68 is provided on one half cycle of the grid potential in preparation for its use on the next half cycle.

Current limit resistors 79 and 80 are provided for the usual purpose of preventing overloading of the phase shifting circuit, and in this case the amount of resistance of these resistors, for example the resistor 80 in Fig. 3, will determine the amount of recharge on the capacitor 68 referred to.

It will of course be understood that the operation of the system for the other tube 5, involving the other reactor winding 25, resistors 70 and 64, and capacitor 65, will be the same as that described for the tube 6.

The saturable reactor windings 25 and 26 as will be noted are separate from each other and wound oppositely so that the two cyclically occurring fluxes produced thereby are in series and not opposed, and while the magnetic flux produced by the unidirectional winding 24 changes the total flux through the windings 25 and 26, to change their effective inductances, the alternating component of the series flux produced by the windings 25 and 26, does not flow through the winding 24 and does not induce an alternating component of current in it to interfere with its operation nor interfere with the operation of the tube 20 and its associated circuits which control the winding 24, as would be true if the windings 24—25—26 were arranged and energized as indicated by prior systems.

For convenience of description hereinafter it may be borne in mind that when the winding 24 is strongly energized the grid phase on the tubes 5—6 is shifted to cause them to have high output, and vice versa.

This phase shifting system, except for its operation in connection with controlling the motor 8, constitutes by itself no part of the present invention, and by itself constitutes the subject matter of my copending application, Serial No. 718,425 filed December 26, 1946, to which reference may be made for a more complete description of the advance which it makes in the art.

With the system in the off position of the parts as illustrated and the motor contactors F and R open, and when line potential is applied by closing line contactor 81, the secondary 33 puts potential on the mains 34—35; the secondary 4 impresses potential on the anodes of the tubes 5 and 6; the phase shift system described above is energized by the primary 42 and bi-phase secondary 43. The inductances of the windings 25—26 of the phase shift system are at this time of maximum effectiveness, because the winding 24 is not energized, and shift the grid energizing wave of the tubes 5—6 to the cut-off position; and the heaters for the cathodes of the two pairs of rectifying tubes, 5—6 and 12—13 are energized by the primary 37 and they start to heat up.

The time delay contactor 49 begins to time its interval.

The anode lines 82—83 of the tubes 12—13 connect with the main secondary 4, and the time relay contacts 50 are in the line 82. The rectifying circuit from the tubes 12—13 comprises a common cathode wire 84, a line 85, to the main 14, a voltage divider and tube control system between the mains 14—15, and the return wire 55 from the main 15 to the center tap of the secondary 4. The field 9 and a voltage divider 86 are connected across the mains 14—15 directly, but the rest of the control system between the mains 14—15 is subject to the inductor 32 in the line of the main 14.

During the time that the relay contacts 50 are open, only the tube 13 acts and impresses alternate half-waves of rectified potential on the mains 14—15.

It is well known that a highly inductive circuit presents great opposition to half waves of rectified current, so that with only one tube, 13, passing current, the field 9 is substantially unenergized due to its own inductance; and the inductance of the inductor 32 similarly blocks off current from the part of the control system subject to it, and the functions of that part of the control system, which includes energizing the unidirectional winding 24 of the saturable reactor to start up the tubes 5—3, are inhibited.

When the time interval passes the contacts 50 close and bring in the tube 12, energizing the field 9 with full wave rectified current and put full wave rectified potential on the mains 14—15; and actuate the control system to start up the tubes 5—6, and give current to the motor as will be described, under control of the control system and of the contactors F and R.

Important advantages and elements of protection are thus provided. The time delay at the contacts 50 gives time for all four of the tubes 5—6 and 12—13 to heat up their cathodes before any substantial current flows therethrough. Even with the motor contacts F1—F2 or R1—R2 closed, if only the one tube 13 is working, the control system between the mains 14—15 is inhibited from actuating the tubes 5—6 to give potential to the motor mains 16—15, and the tube 13 alone, can pass only negligible current; so that all four tubes are protected by the one time relay from passing substantial current before being fully heated up, which might otherwise damage them.

If either tube 12 or 13 should be inoperative due to failure thereof, the field 9 would never become energized, and the motor is protected from the damage of then receiving current from the main tubes 5—6 without a field; and later, with the whole system in operation, if one of the tubes 12 or 13 should fail, and the field therefore should accordingly become de-energized, the control system would then also become inoperative due to the inductor 32 and cut off the tubes 5—6 and the motor current therethrough.

The means for maintaining constant the potential on the mains 14—15 will now be described.

The said voltage divider 86 across the mains 14—15, comprises resistors 87 to 89 inclusive, and an adjustable tap point 90 on the resistor 88.

At 91 is a votage divider across the mains 14—15 comprising resistances 92 to 97 inclusive.

The tube 21 has a main current circuit from the main 14 through a resistor 99, by wire 100, through the tube 21, to wire 98, to main 15, through which current normally flows and produces a potential drop through the resistor 99 which, by wire 101 and 102 energizes the grid of the tube 12 to control its output.

The grid of tube 21 is connected to the point 90.

Any tendency of the potential supplied by the tubes 12—13 to change, for example to increase, which might increase or change the field strength, tends to increase the potential on the mains 14—15. This tendency is largely but not entirely counteracted by the voltage regulating tube 23 between the wire 98 and the main 15. The current through the voltage divider 86 therefore tends to raise slightly the potential at the point 90. The grid circuit of the tube 21 is from the point 90 to the wire 98 and thence to the main 15; and there being a parallel voltage potential drop from the point 90 through the voltage divider 86 to the main 15, the potential drop through these two paths are balanced against each other or "compared," the voltage across the tube 23 being substantially constant.

Any tendency for the voltage on the mains 14—15 to rise therefore tends to raise the potential of the point 90 and disturb this balance, and this energizes the grid of the tube 21 more strongly, and causes it to pass more current and create more potential drop through the resistance 99, and this causes the grid of the tube 12 to become more negative and reduce its potential output; and this returns the potential on the mains 14—15 and the energization of the field 9 to substantially the original value and a constant field energization is the result.

Restoring of the potential on the mains 14—15 and maintaining it constant in this manner is effected jointly by the tube 21 and the voltage regulator tube 23. Variations of potential imposed on the tube 23 are rendered smaller by the regulation effected by the tube 21. The tube 23 therefore has, so to speak, less to do, and can perform its share of regulating the potential across the mains 14—15, more effectively and within a negligible range of variation and in fact substantially without variation, which would not be possible with a voltage regulator tube alone.

The voltage regulator tube 23 is between a wire 98 and the main 15 and is across the resistors 93 to 97 and tends to maintain the voltage drop thereacross substantially constant or within a very small range of variation, and particularly maintains a constant potential between a point 103 on the resistor 94 and the main 15 as a reference or comparison voltage to be referred to; and since the voltage impressed on the tube 23 is made less variable by the tube 21, the tube 23 can keep this voltage very close to an absolutely constant value.

Several results are thus far accomplished: the strength of the field 9 is maintained constant within exceedingly small limits of variation; and the comparison potential at the point 103, and all other points along the voltage divider 91 between the point 103 and the main 15, are maintained to a high degree of constancy by the tube 23 because the variations of potential impressed on the tube 23 are minimized by the tube 21. Also, as will be observed, the control of the potential on the mains 14—15 is effected by only one grid controlled tube 12, the tube 13 being a cheaper and more durable diode.

The full wave diode rectifier tube 22 is supplied with potential from the bi-phase secondary 30—31 energized from primaries 28—29 in the respective anode lines of the main tubes 5—6, which tubes at this time are cut off as referred to; and the tube 22 has a local circuit 104 connecting the cathode and the mid-point of the bi-phase secondary which energizes the tube, comprising resistors 105 to 108 inclusive, the resistors 107 and 108 being identified as parts of a potentiometer having a movable mid-point 109, and the main 15 being connected to this circuit at 110, between the resistors 106 and 107. The tube 22 has the conventional resistor 147 across its secondary 30—31 to limit the current input.

Certain other effects are produced before the main tubes 5—6 come on as follows.

At the moment now being considered the tube 22 is inactive, since the tubes 5—6 are cut off.

The saturable reactor unidirectional winding 24 is in the main circuit of the tube 20, from main 14, through the tube 20 and winding 24, to wire 98 referred to.

The tube 18 has an anode-cathode circuit from the main 14, through a resistor 111, to a point 112, and thence by wire 113, through the tube 18, to wire 114, to point 115 on the voltage divider 91; and the drop of potential through the resistor 111 controls the grid of tube 20, to control the winding 24.

When tube 18 passes sufficient current and causes sufficient drop through the resistor 111, the potential at the point 112 becomes low enough to cause tube 20 to cut off, and cut off the action of winding 24 and thereby cut off the main tubes 5—6; and when tube 18 passes low enough current or cuts off, the potential at the point 112 rises and brings in tube 20 and the winding 24, and causes the tubes 5—6 to pass current, in accordance with the amount of current passed by the tube 18.

To this end, tube 18 is controlled as follows and reference is first made to the tube 19 and the contacts F3 and R3.

The main motor contactors F1—F2 or R1—R2 being at this time open, contacts F3 and R3 are open. The tube 19 has a main circuit from a relatively high potential point 116 on the divider 91, through the tube 19 and by wire 117 to a point 118, and thence through a resistor 119 etc. to main 15; and its grid is likewise energized from point 116 through a resistor 120, and the tube 19 passes current. The potential drop caused by this current in the resistor 119 raises the potential at the point 118. The grid of tube 18 is energized from this point 118 (through a grid current limiting resistor 121) and through the wire 114 to the point 115. Because of the high potential at the point 116, and the corresponding high current passed by the tube 18, the difference of potential at the points 118 and 115 is enough to energize the grid of tube 18 to cause it to pass large current through the resistor 111, and it cuts off the tube 20 and winding 24 as described.

The foregoing operations are all effected as soon as the line contactor 81 is closed; and so long as the motor contactors (including F3 and R3) are open, the main tubes are held off and keep off potential from the mains 16—15.

Assume now that one of the motor contactors F or R, is closed closing F3 or R3. The grid of tube 19 will now be energized from a point 122 of lower potential due to resistor 120, the tube 19 will pass much less current, its current drop in resistor 119 will fall, the potential of the point 118 energizing the grid of tube 18 will fall and tube 18 will cut off, and tube 20, as described, will therefore pass large current, and winding 24 will be strengthened, and the tubes 5—6 will impress potential on the mains 16—15; and the motor armature 7 will receive current; and its field 9 being already fully energized as described the motor will start and accelerate.

Thus by means of opening the contacts F3 (or R3) whenever the motor contactors F (or R) open, whether to stop the motor, or during the short interval of time during which the contactors F and R operate to reverse the motor while running, the potential on the grids of the tubes 5—6 is shifted to cut off these tubes, so that when the contactors F or R again close, the control system must go through its functions from the beginning, thus insuring that current to the motor will always be under full control of the system.

When the potential output of the tubes 5—6 is impressed on the motor mains 16—15, as just described, the motor may be lightly or heavily loaded and accelerate rapidly or slowly, but in either event and in the absence of other provisions the armature current would rise at once to a destructive value; but according to the invention the current itself is utilized to modify the potential output of the tubes 5—6 so as to insure that the armature current can never exceed a predetermined maximum, and so that the motor will always accelerate at the maximum safe rate.

To this end, the motor armature current in the primaries 28—29 energizes the bi-phase secondaries 30—31, actuating the diode 22, which passes full wave rectified current through its said local circuit 104 of a value proportional to the armature current, and which current will hereafter be referred to as "proportional" current. This proportional current produces a drop of potential from the point 123 at the lower end of the resistor 119, to the point 110 on the main 15, and it "compares" or is balanced against the potential from the point 116 to the main 15.

As the motor armature current rises toward the said maximum, the potential drop from the point 123 to the main 15 rises accordingly, determined by the setting of the point 123, and raises the potential of the point 118, causing the tube 18 to pass more current through the resistor 111. The tube 20 accordingly passes less current as aforesaid because of more drop in the resistor 111, and more negative potential on its grid, and this weakens the current in the saturable reactor winding 24 and causes the tubes 5—6 to begin to pass decreasing potential to the mains 16—15.

By the time the motor armature current reaches a predetermined maximum, the potential from the tubes 5—6 has in this manner been reduced to the value at which it cannot cause the current to exceed the said maximum. Thus the motor armature current rises at once to a high value but cannot exceed a predetermined maximum value so that the motor accelerates at the most rapid possible safe rate whether loaded or not loaded.

As will be apparent the value of the maximum current attained may be adjusted by adjusting the position of the point 123 on the local circuit resistor 105.

The motor as will now be explained comes up to a preset speed, which is held constant, even under variable motor load conditions, and if the current had attained said maximum value the current falls back to a value corresponding to the load on it, and corresponding to the speed and reference is made to the tube 17, and to a resistor 124.

The resistor 124 is connected at one end to the main 15 and at the other end by a wire 125 to the point 103, and the potential drop in the resistor 124 is therefore "compared" with the potential drop between the point 103 and the main 15, and the latter being held constant as described, the potential drop through the resistor 124 is constant.

At 126 is a voltage divider across the motor mains 16—15 comprising resistances 128 to 130 and including the part 107 of the said potentiometer resistance 107—108.

The tube 17 has its anode connected by a wire 131 to the point 112 at the lower end of the resistor 111. Its cathode is connected by a wire 133 to a movable point 132 on the resistor 124. Its grid is energized from a point 132 on the voltage divider 126, through a current limiting resistor 135 to the point 134.

The potential on the mains 16—15 and on the voltage divider 126, providing for the rising armature current is relatively low at the start and produces a potential at the point 132 insufficient to cause the tube 17 to pass current through the resistor 111 and lower the potential at the point 112 and weaken the winding 24 by the tube 20, to decrease the potential output of the tubes 5—6; but at a potential on the point 132 higher than at the point 134, which later occurs, it will do so.

The rising current in the local circuit 104 and flowing through the resistor 107 produces drop of potential in the resistor 107, which in effect is a part of the voltage divider 126, and this acts to tend to lower the potential at the point 132.

While the motor is accelerating and the potential on the mains 16—15 is controlled as described to hold the armature current at the said maximum, the countervoltage of the motor is rising; and any tendency for this rising counter-voltage to oppose the potential on the mains 16—15 and reduce the armature current, is met by the maximum current control already described, to strengthen the winding 24 and raise the potential on the mains 16—15 to maintain the armature current at the maximum. As a consequence the potential on the mains 16—15 must rise, and does rise as acceleration proceeds, in correspondence with the increasing speed of the motor.

This rising potential on the mains 16—15 raises the potential at the point 132 in spite of the tendency of the drop in the resistor 107 to lower it; and as the potential at the point 132 rises due to rising counterelectromotive force, it comes to a predetermined relation to or excess over the preset potential at the point 134, and the grid of tube 17 becomes energized sufficiently to cause the tube 17 to begin to pass current, and cause the tube 20 to weaken the winding 24 to cause reduction of the main tube output.

By the time the motor has come up to a certain speed, the weakening of the winding 24 by the tube 17 has advanced so far that the main tubes cannot supply sufficient potential to satisfy the countervoltage and also supply the maximum armature current; so that the armature current begins to fall off. This reduces the proportional current and ultimately reduces the potential at the point 118 enough to cause the tube 18 to cut off; and then the control of the winding 24 is placed upon the tube 17 alone. Thereafter the tube 17 will respond to the potential at the point 132 due, differentially, to the proportional current in the resistor 107 tending to lower it, and to voltage on the mains 16—15 tending to raise it.

The speed and motor counterpotential, and the potential at the point 132, rise, and the motor current falls from maximum, until a predetermined relation exists between the potentials at the points 132 and 134. Then the motor speed stops rising and the motor runs at that speed (determined by presetting of the point 134) because any momentary increase of motor speed to an excessive speed and corresponding excessive counterpotential, would, by action of the tube 17, weaken the winding 24 until the main tube output potential would be insufficient to maintain the excessive speed.

The armature current in the resistor 107 tending to reduce potential at the point 132 does so in proportion to the current demand of the armature at the predetermined preset speed at which it now runs.

If the load on the motor increases after it has come up to its preset speed, tending to slow it down and make it take more current, more drop will occur in the resistor 107, and lower the potential at the point 132, and the tube 17 will strengthen the winding 24 to raise the potential on the mains 16—15 accordingly, or vice versa, to restore its speed.

In some cases, it may be desired to have the motor slow down somewhat with increases of load. This can be done by setting the point 109 nearer to the main 15; or if it be desired to have it speed up with increases of load the point may be set farther from the main 15. For each individual motor there may need to be a different value for the resistor 107 to keep the motor speed constant at variable load, and this is provided for by the adjustable point 109.

If a rise of potential on the main supply lines 3—3 should occur, it will raise the potential at the point 132 and cause the tube 17, resistor 111 and tube 20 to act to weaken the winding 24, and reduce the potential output of the tubes 5—6; and vice versa; so that the system automatically operates without additional means to compensate for changes of line voltage which might otherwise change the speed of the motor.

When the motor is suddenly reversed while running the auxiliary contacts F3 and R3 come open during the movement of the main motor contacts in making the changeover. This as described immediately cuts off all potential output of the tubes 5—6; and the system starts functioning from the beginning to bring these tubes in with the potential thereof under full control for the purposes described.

In some prior systems of this general class auxiliary contacts are provided on the reversing contactors for this general purpose; but they are contacts which close instead of opening, when the main motor contacts open; and the establishing of control circuit connections by closing auxiliary contacts is not as positive and reliable as it is by opening contacts. To be effective in either case the auxiliary contacts must move from one position to the other rapidly. Contacts upon closing tend to bounce or vibrate. Opening contacts do not, so that an improvement in quickness of response and reliability and safety of operation of the system is effected by arranging the circuits so that the auxiliary contacts which as here perform a protective function will do so upon opening.

When the motor is suddenly reversed while running, the liability that the unidirectional potential of the reversed motor will render the grid control of the tubes 5—6 ineffective to safely limit their output, is overcome by the utilization of the improved grid phase shift system as already described.

From the foregoing it will be apparent that upon suddenly reversing the motor while running, the motor current comes up only to the safe maximum value and stays there until the motor has been brought to rest, and then reverses and accelerates in the other direction, with all of the features of control described above; and that when accelerating in the reverse direction the contacts R3 will be closed instead of the contacts F3 with the same results.

To stop the motor the stop push button 46 is operated which not only opens the main motor contacts F1—F2 or R1—R2 as the case may be, but also opens the auxiliary contacts F3 or R3 and the latter return the control system to the conditions described above when these contacts were open, among which conditions are the cutting off of the potential from the main tubes 5—6, so that the control system is rendered safe by opening the contacts F3—R3, and on the next closure of the main contacts (and the auxiliary contacts F3—R3) the tubes 5—6 will be actuated and controlled to again safely bring up the potential on the mains 16—15 and bring up the motor current to but not beyond, the safe maximum value, and this protection is particularly valuable when the motor is reversed while running.

When stopping the motor by the push button 46, dynamic braking by the contacts D1—D2 and resistor 11 come into action as described.

The current limit control as above described limits the armature current at all times to a predetermined safe maximum by weakening the saturable reactor winding 24, by the rise of potential at the point 118, when the maximum current occurs in the local circuit of the tube 22.

The contacts F3 and R3 by being open before contacts F1—F2 or R1—R2 close, provide a weakened energization for the winding 24 in advance; so that when the contacts F1—F2 or R1—R2 and F3 or R3 close, and the motor current starts to rise toward the maximum value at which the winding 24 must be weak, its in-advance weakening renders it more sensitively responsive to weakening when called for to limit the current.

There is a general tendency in servo-mechanisms of which the present system may be considered as one, to "hunt" or overtravel when regulating; and when saturable reactors are utilized, the saturable reactor is one of the elements which tend to introduce hunting; and the tendency of the present invention to hunt when regulating at the maximum current is counteracted by this in-advance weakening of its winding 24 as above described.

As a means to further counteract and eliminate hunting or overtravel in the current limit part of the present system, the following means and mode of operation is provided.

When the contacts R3—F3 are open, there is, as mentioned, elevated potential at the point 118, which cuts in tube 18 and weakens the saturable reactor winding 24. When contacts R3—F3 close (upon closure of the main motor contactors F or R) the potential at the point 118 immediately becomes sufficiently negative to cut off tube 18, and the saturable reactor winding 24 becomes strengthened, and main motor current flows, and proportional current in the local circuit 104 of tube 22 builds up rapidly toward maximum; and this rapidly raises the potential at point 118 toward the value at which tube 18 will again come in and control the strength of the winding 24.

Due to inherent time factors in the system, the potential at the point 118 however will not always correspond to the changes of the proportional current and the strength of the saturable reactor winding 24 will not always correspond to changes of potential at the point 118, and the effect of the saturable reactor on the main tubes 5—6 will not always be in correspondence with the potential at the point 118 and with the proportional current, particularly if the proportional current should for any reason fluctuate rapidly. It becomes desirable therefore to restrain the rate at which the potential at the point 118 changes, to stabilize the action of the system and prevent overtravel of the regulation and hunting.

This restraint is accomplished by a capacitor 136 and a resistor 137 connected across the point 118 and the cathode end of the winding 24.

As a further means of stabilization, a capacitor 138 is placed across the point 118 and the cathode of tube 18. There is a tendency for the potential at the point 118 to fluctuate due to the fact that the current in the local circuit 104 is rectified alternating current; and the capacitor 138 averages out the fluctuations of potential at the point 118.

The hereinbefore described control of the potential on the mains 14—15 by the tube 12 to keep it constant, is stabilized and rendered more certain and reliable by the following means.

As described, the tube 21 passes current, under control of its grid, through resistor 99; and the drop of potential in this resistor controls energization of the tube 12 and controls its output. The grid of tube 21 is energized from the point 90 on the resistor 88 and is therefore subjected to the fluctuations of the rectified current in the resistor 88. A capacitor 139 across the point 90 and the cathode of tube 21 acts to average out these fluctuations and stabilizes and renders more uniform the current through tube 21 and the potential on the grid of tube 12. A conventional grid resistor 140 and a conventional capacitor 141 are utilized for the grid of tube 12.

The grid of tube 12 is subjected to a sine wave rectified potential from the cathodes of the tube 12—13 in addition to the said uniform unidirectional potential. By utilizing a resistor 142 in the line of the grid wire 102, and a capacitor 143 between the resistor 142 and the cathode wire 84, the variations of grid potential due to the rectified sine wave are averaged out. The capacitor 143, however, due to the rectified sine wave impressed upon it, may cause fluctuation in the grid wire 102 which are impressed upon the main circuit of the tube 21 and tend to cause fluctuations in the potential drop in the resistor 99 supplying grid potential, and these are averaged out by a capacitor 144 across the main terminals of the tube 21.

Thus the potential on the grid of the tube 12 is maintained uniform and its control of the potential on the mains 14—15 is made more nearly uniform as well as constant.

In this connection, further stabilization is provided by a capacitor 148 connected across the mains 14—15, subject to the inductor 32. It is desirable for the field 9 to be energized by the fluctuating full wave rectified potential as described. However, the controls between the mains to the left of the inductor 32 (as viewed in the drawing) operate more accurately and stably, if these wave fluctuations are averaged out. This is done by the joint action of the capacitor 148 and the inductance of the inductor 32.

Stabilization of the constant speed control, particularly upon a change of speed by change of adjustment at the point 134, is effected as follows.

In general, the potential on the mains 16—15, is controlled to keep the speed constant, by current through the tube 17, responding to potential at the point 132 as described. The potential on the mains 16—15 is rectified full wave potential and therefore fluctuates. These fluctuations are communicated to the point 132, and cause fluctuations in the main current of the tube 17. Better, more stable action is therefore effected by putting a capacitor 149 across the point 132 and the cathode of tube 17 to average out these fluctuations of main current in tube 17.

Upon changing adjustment at the point 134, say to increase the motor speed, the potential at point 132 is thereby raised to effect an increase of potential on the mains 16—15. There are however, inherent time delays in the system, and the increased potential on the mains may overtravel and settle back to the required potential or hunt before it arrives at it.

To stabilize this response of potential at the point 132, a capacitor 145 is placed between the main 16 and a point 146 between the resistors 129—130.

It causes the potential at the point 132 to rise to a higher value than that which it will ultimately attain, when the potential on the mains 16—15 starts to rise due to said adjustment, and this temporary excess of potential at the point 132 "anticipates," and prevents overtravel of the increased potential on the mains. The capacitor 145 would have this effect at the point 132 for changes of adjustment of speed, if it were connected to the voltage divider 126 at the point 132, but by connecting it between the resistors 129 and 130 at the point 146, it also in like manner "anticipates" at 132, the tendency of the potential to change upon changes of adjustment at the point 109.

The advantages above described of having the contacts R3 and F3 in open condition when the main motor contactors F or R open, are augmented when the electromagnetic contactors R and F have their contacts designed so that the contacts R3 and F3 open before the main contacts R1—R2 or F1—F2 open, and close after they close.

The phase shifting system to control tubes 5—6 is as described, under control of the saturable reactor winding 24, and the latter is under control of the maximum current limit part of the system. When the motor is reversed while running, the armature current quickly rises to the maximum and is held there, by weakening of the winding 24, which shifts the grid phase of the tubes 5—6 toward the late firing portion of the tube-impressed potential waves. The unidirectional counterpotential of the motor will then cause the main tube rectifying system to invert, and absorb the energy of the motor by supplying it back to the mains 3—3 as alternating current, and this will very quickly slow down the motor to stop it and allow it to then reverse.

Thus during the inversion operation also the armature current and main tube current are under control of the grid phase controlling system.

In the process of reversing the motor while running, the main motor contacts F1—F2 or R1—R2 whichever happened to be closed, come open, and while they are open, the contacts R3 and F3 are open; and the open condition of these contacts, as described, causes the saturable reactor winding 24 to be pre-weakened. This causes the grid phase to be shifted in the direction correct for inversion, which is, as known, less than 90 degrees from the cut off phase, and inversion therefore begins when the reversing motor contacts close.

It is now believed to be apparent that when the motor contactors F or R, are operated to reverse the motor while running, inversion slows down the motor to bring it to rest; and rectification immediately accelerates it in the reverse direction, and with the current limited to a maximum in both instances. The motor therefore may be rapidly reversed, back and forth, and the current is at all times held within safe limits.

In addition to the protective features above described, I provide means to insure that the system will go to a safe condition automatically in the event of failure of the tubes 17 or 20 to pass current due to failure of their cathode heating circuits. Failure of the tube 17 to pass current would discontinue its effect of controlling the current passed by the tube 20, and the latter would strengthen the winding 24 without control and the tubes 5—6 would then give full uncontrolled output. Failure of the tube 20 rendering it inoperative to pass current would cause it to permanently weaken the winding 24 and permanently reduce the output of tubes 5—6 to a minimum safe or cut-off value. The arrangement provides for rendering the tube 20 inoperative as stated upon failure of tube 17. This is done as follows. The cathode heaters of the tubes 17 and 20 are connected in series by a wire 147, and both energized by potential across the wires 40A and 40B, which wires are shown in the upper left hand part of Fig. 1 as being the output wires of one of the secondaries of the cathode heater energizing group, 38—39—40, etc. referred to hereinbefore, for example the secondary 40.

The invention is not limited to the exact arrangement of parts and circuit connections illustrated and described. Changes and modifications may be made that come within the scope of the appended claims and are intended to be covered thereby.

I claim:

1. In a direct-current shunt-field-motor control system energized from alternating current supply mains; motor armature mains; a rectifying system for supplying rectified potential of the supply mains to the armature mains; field mains; a rectifying system for supplying rectified potential of the supply mains to the field mains comprising a pair of rectifying tubes; means to maintain the field mains potential constant comprising: a grid for one of the rectifier tubes and a control therefor comprising a voltage divider subjected to the potential of the field mains; a control tube having a grid energized from a point on the voltage divider; a resistor and the anode-cathode of the control tube and the anode-cathode of a cold cathode voltage regulator tube, connected in series relation across the field mains; and a grid connection from a point between the resistor and the control tube anode to the said grid of the said one of the rectifier tubes.

2. In a direct-current shunt-field-motor control system energized from alternating current supply mains; motor armature mains; a rectifying system for supplying rectified potential of the supply mains to the armature mains; field mains; a rectifying system for supplying rectified potential of the supply mains to the field mains comprising a pair of rectifying tubes; means to maintain the field mains potential constant comprising: a grid for one of the tubes and a control therefor comprising a voltage divider subjected to the potential of the field mains; a control tube having a grid energized from a point on the voltage divider; a resistor and the anode-cathode of the control tube and the anode-cathode of a cold cathode voltage regulator tube connected in series relation across the field mains; a grid connection from a point between the resistor and the control tube anode to the said grid of the said one of the rectifier tubes; a second resistor in the line of the said grid connection; a capacitor between the second resistor and the cathode of said rectifier tube; and a capacitor across the anode and cathode of the control tube.

3. In a direct-current shunt-field-motor control system energized from alternating current supply mains; motor armature mains; a rectifying system for supplying rectified potential of the supply mains to the armature mains; field mains; a rectifying system for supplying rectified potential of the supply mains to the field mains comprising a pair of rectifying tubes; means to maintain the field mains potential constant comprising: a grid for one of the tubes and a control therefor comprising a voltage divider subjected to the potential of the field mains; a control tube having a grid energized from a connection point on the voltage divider; a resistor and the anode-cathode of the control tube and the anode-cathode of a cold cathode voltage regulator tube, connected in series relation across the field mains; a grid connection from a point between the resistor and the control tube anode to the said grid of the said one of the rectifier tubes; a second resistor in the line of the said grid connection; a capacitor between the second resistor and the cathode of said rectifier tube; a capacitor across the anode and cathode of the control tube; and a capacitor between the connection point on the voltage divider and the cathode of the control tube.

4. In a direct-current shunt-field-motor control system energized from alternating current supply means; motor armature mains; a rectifying system for supplying rectified potential of the supply mains to the armature mains; field mains; a rectifying system for supplying rectified potential of the supply mains to the field mains comprising a pair of rectifying tubes; means to maintain the field mains potential constant comprising: a voltage divider across the field mains; a circuit comprising, in series relation across the field mains, the anode-cathode of a cold cathode voltage regulator tube and the anode-cathode of a control tube; the control tube having a grid energized from a point on the voltage divider; one of the rectifier tubes having a grid; and connections energizing the rectifier tube grid proportionally to current in the anode-cathode circuit of the control tube.

5. In a direct-current shunt-field-motor control system energized from alternating current supply mains; motor armature mains; a rectifying system for supplying rectified potential of the supply mains to the armature mains comprising a pair of rectifier armature tubes having control grids; motor shunt field mains; a rectifying system for supplying rectified potential of the supply mains to the motor shunt field mains comprising a pair of rectifier field tubes; an actuating system connected to the control grids, and energized from the source for actuating the armature tubes; control system mains supplied with unidirectional current from the rectifier field tubes; a control system energized across the control system mains controlling actuation of the armature tubes by the actuating system; an inductive reactor interposed between a field main and a control system main, to cause the control system to prevent actuation of the armature tubes by the actuating system upon failure of either of the field tubes.

6. In a control system, for a direct current shunt field motor; alternating current supply mains; motor armature mains for connection to an armature circuit between the armature mains; a rectifying system comprising a pair of grid controlled rectifier armature tubes, for supplying rectified potential of the supply mains to the armature mains; a source of unidirectional current and control system mains energized thereby; a phase shifting control for the grids of the armature tubes, comprising a saturable reactor having a unidirectional current winding; a first control tube controlled by a grid and having main electrodes energized from the control system mains and controlling the current in the winding; a second control tube controlled by a grid and having main electrodes and a resistor in series therewith energized from the control system mains; a connection from the grid of the first control tube to a point between the resistor and the second control tube; a contactor for closing the armature circuit having normally open main contacts and auxiliary contacts; a voltage divider energized by the control system mains; a third control tube having its main electrodes and its grid energized at relatively high potential from the voltage divider and a second resistor in series with its main electrodes; the current through the main electrodes of the third control tube energizing the grid of the second control tube by drop of potential through the second resistor, thereby causing the second control tube to pass current through the first resistor and reduce energization of the grid of the first control tube and cause the first control tube to energize the winding at a low value; an auxiliary circuit, from the grid of the third control tube to a lower point on the voltage divider controlled by the auxiliary contacts; closure of the auxiliary contacts upon closure of the motor contacts closing said auxiliary circuit, and causing reduction of the current through the main contacts of the third control tube and the second resistor and thereby reducing the current through the second control tube and through the first resistor and causing the first control tube to energize the winding at a higher value.

7. In a motor control system, a source of alternating current; a pair of motor mains for connection to a motor circuit; a rectifying system comprising a pair of rectifier tubes having control grids, for supplying rectified potential from the source to the motor mains; a phase shift system energized from the source and connected to the control grids and comprising a saturable reactor winding and controlling the rectifier tube grids to change the motor mains potential in response to changes of current in the winding; a source of unidirectional potential and a voltage divider connected across the source; the winding connected to be energized from the unidirectional current source; control circuits normally connected to be energized from a selected voltage point on the voltage divider; the control circuits controlling the energization of the winding, and normally maintaining the winding weakly energized, and the rectifier tubes being responsive to the weak winding energization to be maintained substantially inactive; normally open main contactor operable to be closed for closing the motor circuit and having normally open auxiliary contacts closing concurrently with the main contactor; the auxiliary contacts upon closing connecting the control circuits to be actuated by potential at another selected point on the voltage divider to effect energization of the winding more strongly, the rectifier tubes being responsive to the stronger energization to supply potential to the motor mains.

8. In a motor control system, a source of alternating current; a pair of motor mains for connection to a motor circuit; a rectifying system comprising a pair of rectifier tubes having control grids, for supplying rectified potential of the source to the motor mains; a phase shift system energized from the source and connected to the control grids and comprising a saturable reactor winding and controlling the rectifier tube grids to change the motor mains potential in response to changes of current in the winding; a source of unidirectional potential and a voltage divider connected across the source; control circuit means normally connected to be energized from a selected voltage point on the voltage divider, the control circuit means controlling energization of the winding, and normally maintaining the winding weakly energized, and the rectifier tubes being responsive to the weak energization, to be maintained substantially inactive; a normally open main contactor operable to be closed for closing the motor circuit and having normally open auxiliary contacts closing concurrently with the main contactor; the auxiliary contacts upon closing connecting the control circuits to be actuated by potential at another selected point on the voltage divider to effect energization of the winding more strongly; the rectifier tubes being responsive to the stronger energization to supply potential to the motor mains to cause motor current to flow in a motor circuit connected to the motor mains; a local circuit containing resistance in which current is caused to flow proportional to motor circuit current; and control circuit means connected to be energized by potential produced by current in the local circuit resistance and controlling energization of the winding and causing its energization to be reduced commensurably with said local circuit current.

9. In a motor control system, a source of alternating current; a pair of motor mains for connection to a motor circuit; a rectifying system comprising a pair of rectifier tubes having control grids for supplying rectified potential of the source to the motor mains; a phase shift system energized from the source and connected to the control grids and comprising a saturable reactor winding and controlling the rectifier tube grids to change the motor mains potential in response to changes of energization of the winding; a pair of control mains and means subjecting them to unidirectional potential; a voltage divider connected to be energized by the control mains potential; a triode having its grid connected to be subjected to a preselected potential derived from the voltage divider; actuating circuit means connected to be supplied with current from the control mains and comprising a first circuit through the main electrodes of the triode, and a second circuit through the said winding and arranged to cause the current in the second circuit and in the winding to change with changes of current in the first circuit; the triode being responsive to the predetermined potential connection of its grid to normally maintain current in the first circuit that maintains relatively weak current in the winding; and the phase shift system being responsive to said relatively weak winding current to maintain the rectifier tubes normally substantially inactive; normally open main contactor means operable to be closed for closing a motor circuit connected to the motor mains, and normally open auxiliary contacts arranged to close concurrently with closing of the main contactor means; the auxiliary contacts, upon closing connecting the grid of the triode to be energized by another preselected potential derived from the voltage divider, to cause a change of current in the said first circuit and a corresponding increase of current in the winding to cause the rectifier tubes to supply potential to the motor mains and thereby current to the motor circuit.

10. In a motor control system, a source of alternating current; a pair of motor mains for connection to a motor circuit; a rectifying system comprising a pair of rectifier tubes having control grids for supplying rectified potential of the source to the motor mains; a phase shift system energized from the source and connected to the control grids and comprising a saturable reactor winding and controlling the rectifier tube grids to change the motor mains potential in response to changes of energization of the winding; a pair of control mains and means subjecting them to unidirectional potential; a voltage divider connected to be energized from the control mains potential; a triode having its grid connected to be subjected to a preselected potential derived from the voltage divider; actuating circuit means connected to be supplied with current from the

21 control mains and comprising a first circuit through the main electrodes of the triode, and a second circuit through the said winding and arranged to cause the current in the second circuit and in the winding to change with changes of current in the first circuit; the triode being responsive to the predetermined potential connection of its grid to normally maintain current in the first circuit that maintains relatively weak current in the winding; and the phase shift system being responsive to said relatively weak winding current to maintain the rectifier tubes normally substantially inactive; normally open main contactor means operable to be closed for closing a motor circuit connected to the motor mains, and normally open auxiliary contacts arranged to close concurrently with closing of the main contactor means; the auxiliary contacts upon closing connecting the grid of the triode to be energized by another preselected potential derived from the voltage divider, to cause a change of current in the said first circuit and a corresponding increase of current in the winding to cause the rectifier tubes to supply potential to the motor mains and thereby current to the motor circuit, a local circuit containing resistance in which current is caused to flow proportional to motor circuit current; a second triode having its grid connected to be energized by potential produced by current in the local circuit resistance, and having a main electrode circuit supplied with current from the control mains; and circuit means rendering the current in the said second circuit and winding responsive to decrease in correspondence with increase of current in the second triode main electrode circuit effected by increase of current in the local circuit.

11. In a motor control system; a source of alternating current; a pair of motor mains for connection to a motor circuit; a rectifying system comprising a pair of rectifier tubes having control grids for supplying rectified current from the source to the motor mains; a phase shift system energized from the source and connected to the control grids and comprising a saturable reactor winding and controlling the rectifier tube grids to change the motor circuit current in response to changes of current in the winding; a normally open main contactor operable to be closed for closing a motor circuit connected to the motor mains and normally open auxiliary contacts arranged to close concurrently with the main contactor, a pair of control mains and means subjecting them to unidirectional potential; a voltage divider connected to be energized by the control mains potential, a first, second, and third triode; a first circuit comprising the main electrodes of the first triode connected in series with the winding and supplied with current from the control mains; a second circuit comprising the main electrodes of the second triode connected in series with a first resistor and supplied with current from the control mains, and the grid of the first triode connected to be energized from potential drop through the first resistor; a third circuit comprising the main electrodes of the third triode connected in series with a second resistor and supplied with current from the control mains, and the grid of the second triode connected to be energized from potential drop through the second resistor; the grid of the third triode connected to be energized from a selected high potential point on the voltage divider when the auxiliary contacts are open, and the closing of the auxiliary contacts connecting it to be energized from a selected low potential point on the voltage divider.

12. In a motor control system; a source of alternating current; a pair of motor mains for connection to a motor circuit; a rectifying system comprising a pair of rectifier tubes having control grids for supplying rectified current from the source to the motor mains; a phase shift system energized from the source and connected to the control grids and comprising a saturable reactor winding and controlling the rectifier tube grids to change the motor circuit current in response to changes in current in the winding; a normally open main contactor operable to be closed for closing a motor circuit connected to the motor mains and normally open auxiliary contacts arranged to close concurrently with the main contactor, a pair of control mains and means subjecting them to unidirectional potential; a voltage divider connected to be energized by the control mains potential, a first, second, and third triode; and a local circuit containing resistance in which current is caused to flow proportional to the motor circuit current; a first circuit comprising the main electrodes of the first triode connected in series with the winding and supplied with current from the control mains; a second circuit comprising the main electrodes of the second triode connected in series with a first resistor and supplied with current from the control mains, and the grid of the first triode connected to be energized from potential drop through the first resistor; a third circuit comprising the main electrodes of the third triode connected in series with a second resistor and supplied with current from the control mains, and the grid of the second triode connected to be energized from potential drop through the second resistor; the grid of the third triode connected to be energized from a selected high potential point on the voltage divider when the auxiliary contacts are open, and the closing of the auxiliary contacts connecting it to be energized from a low potential point on the voltage divider; connections subjecting the grid of the second triode to potential produced by local circuit current in the local circuit resistance, to increase the grid energization in correspondence with an increase of current in the local circuit.

13. In a motor control system; a source of alternating current; a pair of motor mains for connection to a motor circuit; a rectifying system comprising a pair of rectifier tubes having control grids for supplying rectified current from the source to the motor mains; a phase shift system energized from the source and connected to the control grids and comprising a saturable reactor winding and controlling the rectifier tube grids to change the motor circuit current in response to changes of current in the winding; a normally open main contactor operable to be closed for closing a motor circuit connected to the motor mains and normally open auxiliary contacts arranged to close concurrently with the main contactor, a pair of control mains and means subjecting them to unidirectional potential; a voltage divider connected to be energized by the control mains potential, a first, second, and third triode, a first circuit comprising the main electrodes of the first triode connected in series with the winding and supplied with current from the control mains; a second circuit comprising the main electrodes of the second triode connected in series with a first resistor and supplied with current from the control mains and the grid of the first triode connected to be energized from potential drop through the first resistor; a third circuit comprising the main electrodes of the third triode connected in series with a second resistor and supplied with current from the control mains, and the grid of the second triode connected to be energized from potential drop through the second resistor; the grid of the third triode connected to be energized from a selected high potential point on the voltage divider when the auxiliary contacts are open, and the closing of the auxiliary contacts connecting it to be energized from a selected low potential point on the voltage divider; and stabilizing circuits comprising a capacitor and a resistor connected across the cathode of the first triode and a point on the second resistor, and a capacitor connected across the cathode of the third triode and said point.

WILLIAM FEW.

REFERENCES CITED

The following references are of record in the file of this patent:

UNITED STATES PATENTS

| Number | Name | Date |
| --- | --- | --- |
| 1,914,193 | Bedford | June 13, 1933 |
| 2,312,117 | Moyer et al. | Feb. 23, 1943 |
| 2,330,429 | Hull | Sept. 28, 1943 |
| 2,337,911 | Mayer et al. | Dec. 28, 1943 |
| 2,404,641 | Leigh et al. | July 23, 1946 |
| 2,421,632 | Livingston | June 3, 1947 |
| 2,422,567 | Puchlowski | June 17, 1947 |